United States Patent [19]

Stucky

[11] 4,358,133

[45] Nov. 9, 1982

[54] ADJUSTABLE WIDTH TRAILER

[76] Inventor: James L. Stucky, R.R. 1, Moundridge, Kans. 67107

[21] Appl. No.: 40,456

[22] Filed: May 18, 1979

[51] Int. Cl.³ .............................................. B60P 3/06
[52] U.S. Cl. ................... 280/656; 180/9.48; 296/26
[58] Field of Search ............... 280/656, 638, 144; 296/26; 180/9.48; 414/537, 538

[56] References Cited

U.S. PATENT DOCUMENTS

| | | | |
|---|---|---|---|
| 3,239,274 | 3/1966 | Weiss | 280/656 X |
| 3,330,574 | 7/1967 | Kulyk | 280/656 |
| 3,559,826 | 2/1971 | Abromavage | 296/26 X |
| 3,895,726 | 7/1975 | Rassieur | 296/26 X |
| 4,101,158 | 7/1978 | Jones | 280/56 X |
| 4,119,224 | 10/1978 | Moody | 280/656 X |

Primary Examiner—Joseph F. Peters, Jr.
Assistant Examiner—Donald W. Underwood
Attorney, Agent, or Firm—Harvey B. Jacobson

[57] ABSTRACT

A trailer frame having fixed wheel track is provided with a forward and rear side platforms, each of which is slidably mounted on the trailer frame to move between a retracted position wherein the platforms extend from the sides of the trailer frame no further than the track of the wheels, and an extended position for carrying large machinery, such as farm equipment. An interconnecting side frame member is attached to the forward and rear platforms when in their extended positions. The interconnecting side frame member slidably engages each of the platforms and bolts to a telescoping side frame member support. The interconnecting side frame members can be easily disconnected and stored in a rear portion of the trailer when the side platforms are in their retracted position.

6 Claims, 11 Drawing Figures

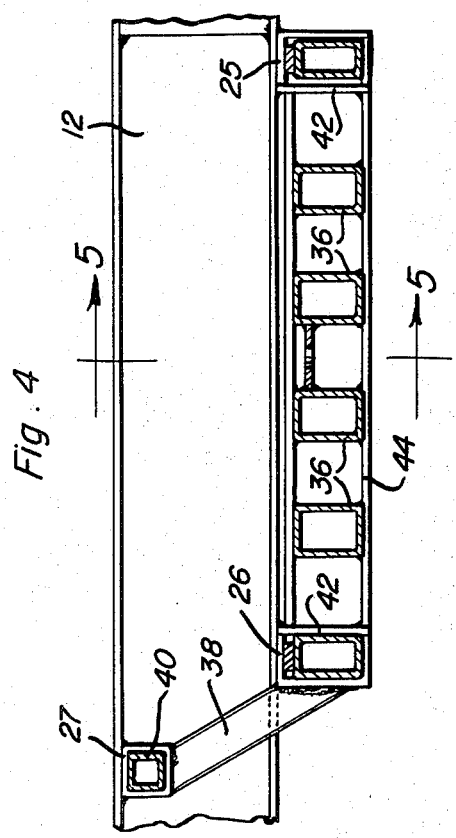
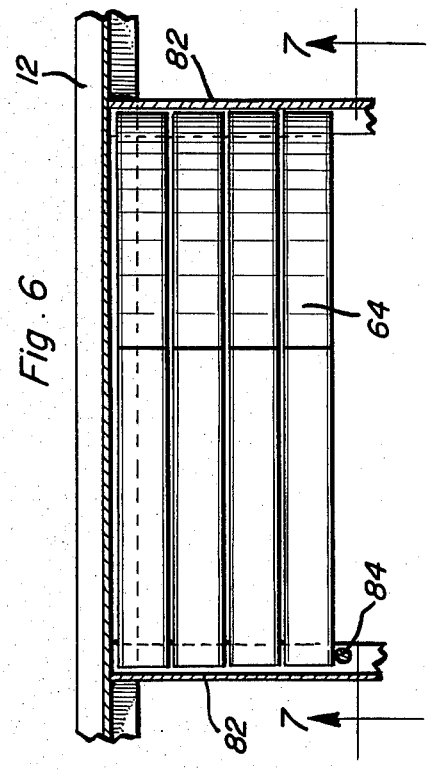
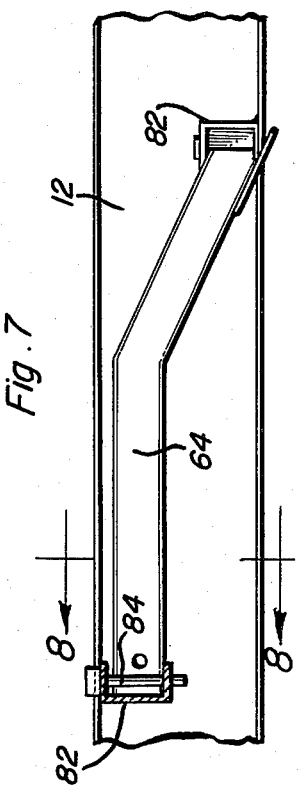
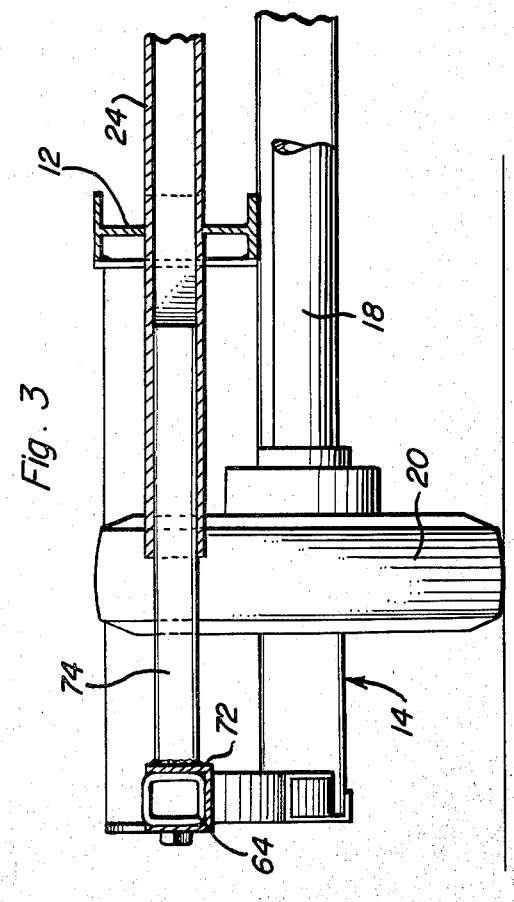
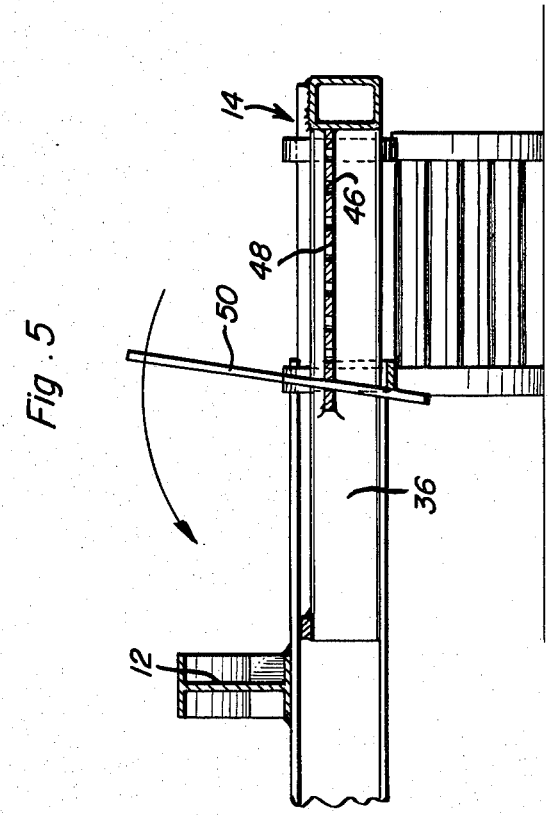

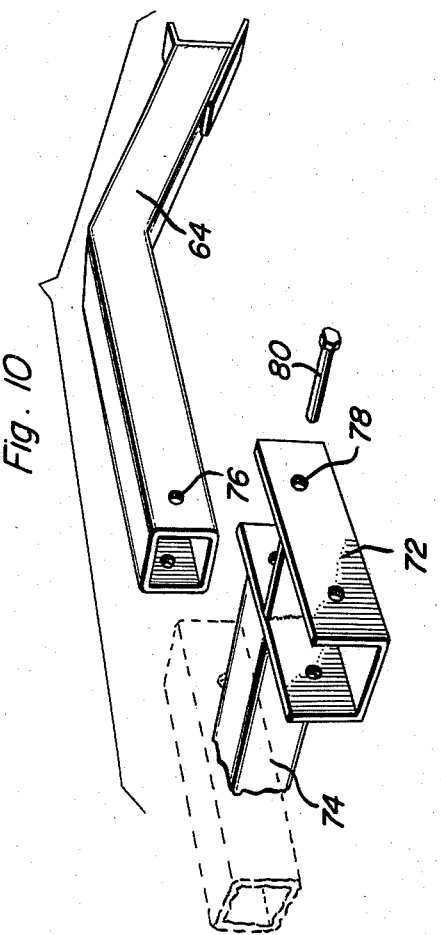
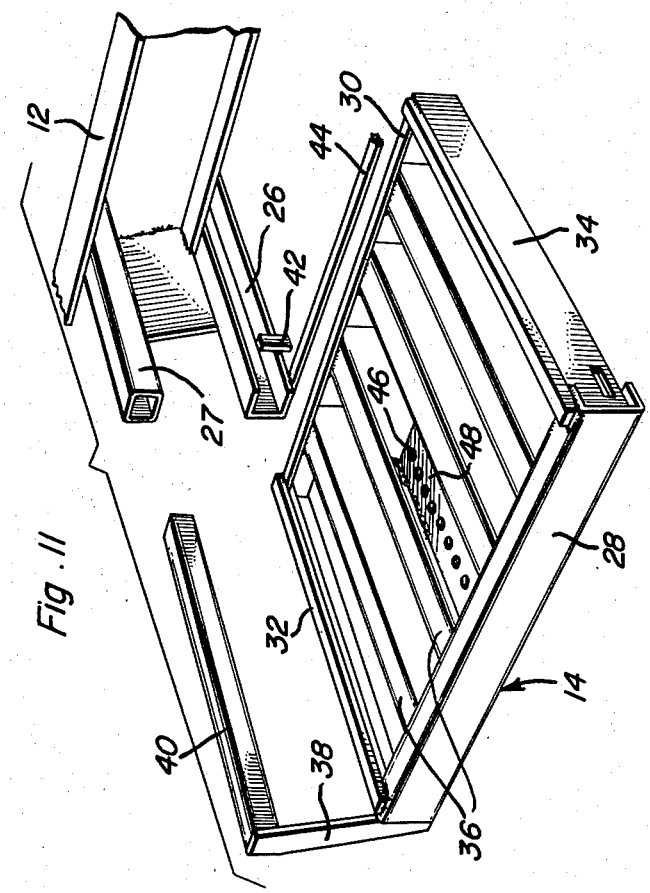
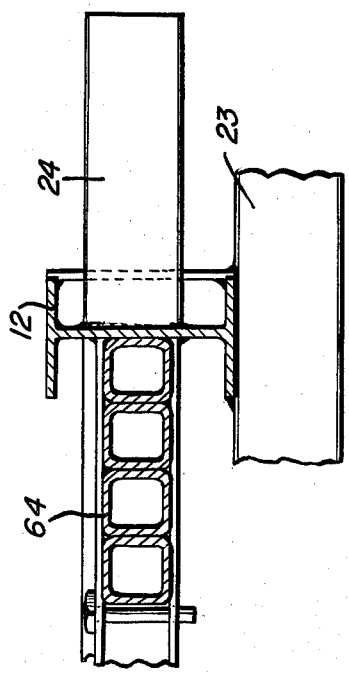
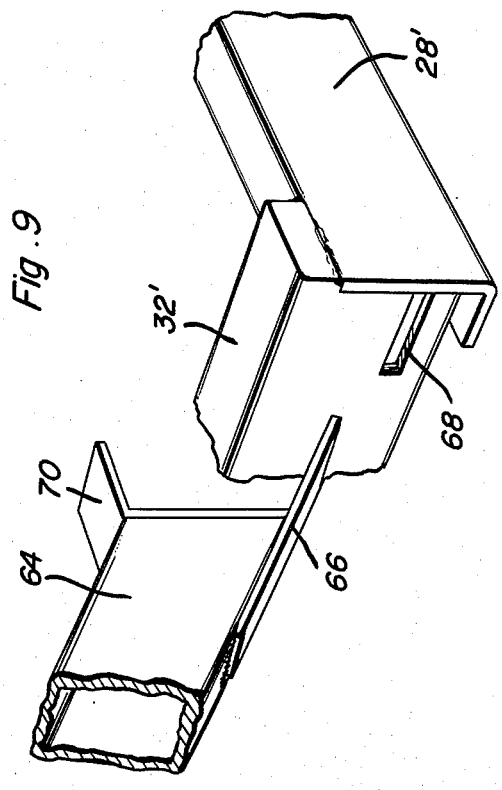

ADJUSTABLE WIDTH TRAILER

BACKGROUND OF THE INVENTION

1. Field of the Invention

This invention relates to trailers which are expandable in width for accommodating large machinery.

2. Discussion of Related Art

In recent years, farmers have been faced with the need to incorporate economies of scale in their operations in order to provide the increased efficiency necessary to maintain a sufficient profit margin to survive in today's inflationary economy. Accordingly, it has become necessary to increase the size and efficiency of the farm machinery being used on the modern farm. In response to this increase in size of farm machinery, a need has developed for the production of trailers which have a width sufficient to allow them to be hauled, in their unloaded state, along public roads but which, when needed, can be easily adapted to accommodate the larger width machines.

In response to this need, trailers having expandable sides have been developed. An example of one such trailer can be seen in U.S. Pat. No. 4,119,224, issued Oct. 10, 1978, to Moody. The Moody trailer includes a main longitudinal frame having support wheels mounted on either side thereof. Each side of the frame contains a plurality of telescoping supports with a side frame member interconnecting all of the telescoping supports. The side frame member can be moved to a retracted position alongside the wheels or to an extended position for accommodating large tractor farm machinery. The Moody device, while useful, is required to have a smaller track than would be desirable due to the necessity of a side frame disposed along the wheels in the retracted position.

SUMMARY OF THE INVENTION

One object of the present invention is to provide an adjustable width trailer including side sections which can be extended to a position for hauling machinery having large wheel tracks.

Another object of the present invention is to provide an adjustable width trailer including support wheels which have a track which can be as great as the largest allowable legal vehicle width.

Yet another object of the present invention is to provide an adjustable width trailer which includes removable side sections extending between a forward and a rear platform. The side sections can be removed and the platforms disposed in a retracted position within the track of the trailer.

Yet another still further object of the present invention is to provide an adjustable width trailer having a plurality of platforms and a plate disposed on each platform with a plurality of apertures formed in each plate for cooperation with a pry bar to facilitate movement of the platforms.

Another object of the present invention is to provide an adjustable width trailer including a main frame which has a storage area therein for retaining removable side sections when the platforms are in their retracted position.

In accordance with the foregoing objects, the invention provides a trailer having a main longitudinally extending frame comprising a pair of parallel I beams. The I beams are mounted on a tandem wheeled fixed track assembly. A platform comprising a framework having a generally rectangular configurion is slidably mounted on a pair of facing C-shaped members. A bar is welded between the lower ends of the C-shaped members and a plurality of apertures are formed in a plate mounted on each platform. The apertures are aligned in a direction transverse of the main frame. Accordingly, a pry bar can be inserted individually through the apertures for moving the individual platforms in or out on the C-shaped support members. A single telescoping support member is disposed between the tandem wheels and can be moved to an extended position. A pair of half side sections each having one end which is slidably received within one of the platforms are attached with their opposite ends bolted to the extended telescoping support. In this manner, a complete side frame is produced. The pair of side frame sections can easily be removed and stored within a pair of longitudinally spaced channel bars provided in the rear of the trailer and extending between the I beams.

These together with other objects and advantages which will become subsequently apparent reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

FIG. 3 is an end elevational sectional view taken substantially along a plane passing through section line 3—3 of FIG. 1.

FIG. 4 is a side elevational sectional view taken substantially along a plane passing through section line 4—4 of FIG. 2.

FIG. 5 is an end elevational sectional view taken substantially along a plane passing through section line 5—5 of FIG. 4 and showing the use of a pry bar for moving the platforms.

FIG. 6 is a plan sectional view showing the storage of the side sections when not in use.

FIG. 7 is a side elevation view taken substantially along a plane passing through section line 7—7 of FIG. 6 and showing the side sections in storage.

FIG. 8 is an end elevational sectional view taken substantially along a plane passing through section line 8—8 of FIG. 7.

FIG. 9 is an enlarged exploded view showing the interconnection of the side sections to the platforms.

FIG. 10 is an enlarged exploded view showing the interconnection of the side sections to the side section telescoping support.

FIG. 11 is an exploded view showing the connection of one forward platform to the main frame.

DESCRIPTION OF THE PREFERRED EMBODIMENT

Figure 1:
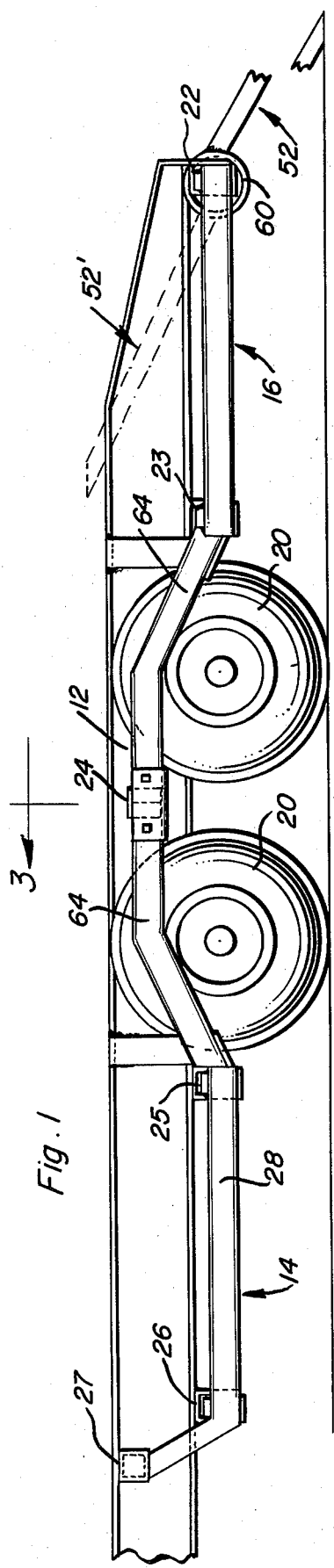
FIG. 1 shows a side elevational view of the adjustable width trailer with the platforms extended and the removable side section in place.

Now with reference to the drawings, an adjustable width trailer incorporating the concepts and principles of the present invention and generally referred to by the numeral 10 will be described in detail. The trailer 10 includes a main longitudinal frame including a pair of parallel spaced I beams 12. Disposed on each side of the main frame is a forward platform 14 and a rear platform 16. Platforms 14 and 16 are laterally movable with respect to the main frame I beams from a retracted position to an extended position for accommodating large machinery.

The main frame I beams 12 are mounted by any suitable known means to axles 18 supported by tandem wheels 20. I beams 12 converge at the forward end of the trailer and are attached to a hitch for connection to a tow vehicle (not shown). The frame members are connected by laterally extending supports including facing C-shaped supports 22 and 23 in the rear, tubular support 24 in the center, facing C-shaped supports 25 and 26 in the front and tubular support 27 in the front. All supports 22 through 27 extend between the I beams 12 and laterally of the I beams to a position within the vehicle track defined by the external extend of the wheels 20. It will be noted that the track of the wheels is capable of being a full eight feet, the normal legal maximum width of road vehicles, since no part of the trailer main frame protrudes past this dimension when the platforms to be subsequently discussed are in their retracted position.

Figure 2:
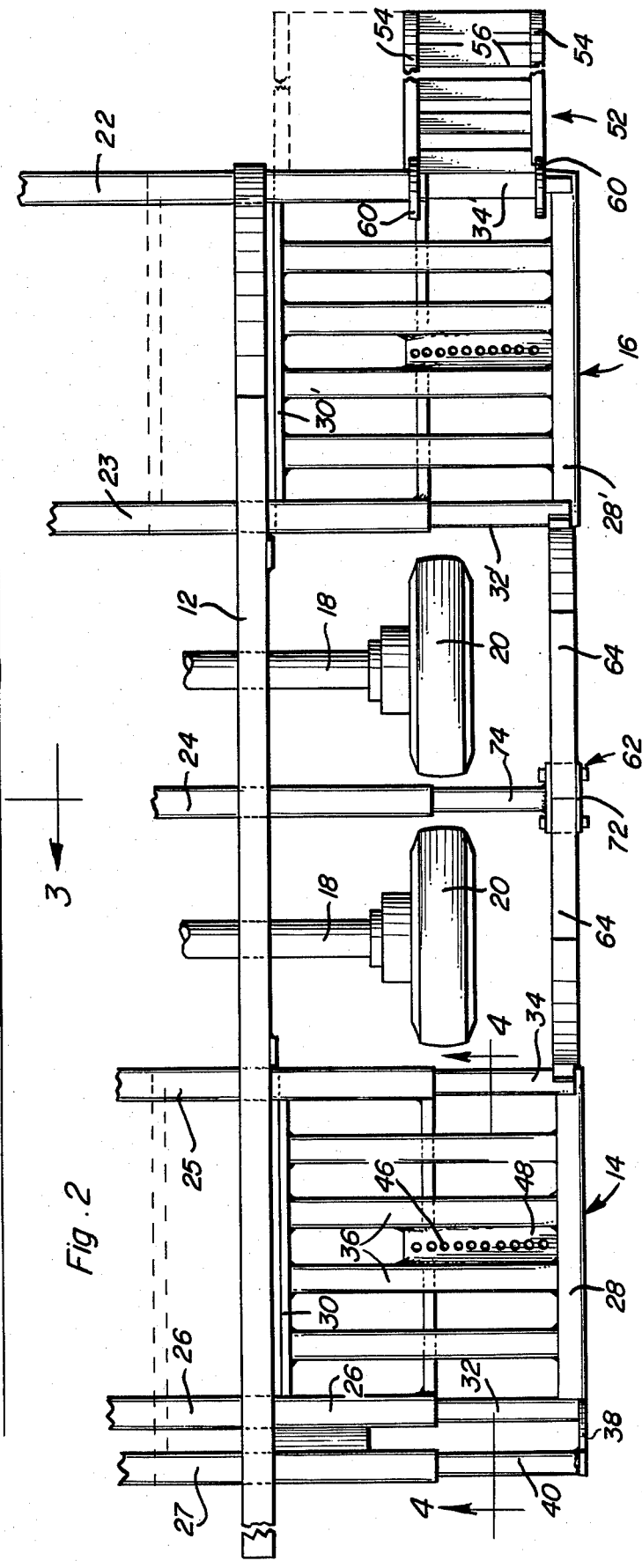
FIG. 2 is a top plan view of the adjustable width trailer.

Forward platform 14 includes a main rectangular frame comprising left frame section 28, right frame section 30, forward frame section 32 and the rear frame section 34. Left and right frame sections 28 and 30 are interconnected by a plurality of lateral members 36. Accordingly, a generally rectangular platform is formed with lateral members 36 serving to support the wheels of the machine to be carried by the trailer. The forward and rear frame sections 32 and 34 of the forward platform 14 are slidably received in facing C-shaped members 26 and 28 and, therefore, the platform can slide between a retracted position (not shown) wherein frame member 28 is substantially aligned with the wheels 20 and an extended position, as shown in FIG. 2. The forward platform 14 also includes support 38, see FIGS. 2 and 4, which is attached to lateral member 40. Member 40 is received in tubular support 27, elevated relative to platform 14 and acts as a stop to define the forward movement of a machine to be transported by the trailer as it is driven forwardly on the platforms. A strap 42, see FIG. 11, is welded across the open end of each C-shaped member 26 to keep the platform from being removed entirely from its mountings. The strap 42 abuts against right side frame member 30 for this purpose. A connecting bar 44 is welded between the C-shaped members and is used in conjunction with apertures 46 which are formed in a plate 48 to facilitate movement of the platform between its retracted and extended positions. As seen in FIG. 5, a pry bar 50 can be inserted through the individual apertures 46 and pried against the connecting bar 44 to move the platform incrementally inward or outward. In this manner, excess force need not be exerted on the platform in order to move it.

The rear platform 16 is essentially the same as forward platform 14 except that it does not contain a stop member 40 or support 38 for the stop member. It does include forward frame section 32', rear frame section 34' and left and right frame members 28' and 30'. Also, mounted on each rear platform is a ramp 52. Ramp 52 contains side rails 54 which are interconnected by ramp cross members 56. Each side rail 54 is welded to a ring 60, which rings surround member 22 and the rear frame member 34' of platform 16. Accordingly, the ramp 52 can be used for driving machinery onto the trailer at which time the ramp can be pivoted upwardly to its storage position as shown in phantom in FIG. 1 at 52'.

Accordingly, it is evident that the platforms 14 and 16 are individually movable between their respective retracted and extended positions. When the platforms are each in their extended positions, they can be interconnected by a side rail 62. Side rail 62 includes a pair of side rail halves 64. Each of the rail halves 64 is formed from rectangular tubular steel with a downwardly inclined portion adapted to slidably engage one of the platforms. As seen in FIG. 9, the slidable engagement is effected through an extension member 66 which is welded to the bottom of the rail halves 64 and is received in an aperture 68 formed in the platform frame member. As shown, the frame member is the forward member 32' of rear platform 16. However, in regard to the forward platform 14, the frame member would, of course, be the rear frame member 34. A second extension 70 is welded to the side rail halves 64 and extends horizontally therefrom. Extension 70 is adapted to rest upon the frame member 32' and support the side rail vertically. The opposite end of each side rail half 64 is supported in a longitudinally running channel section 72 shown in FIG. 10. Section 72 is welded to the end of laterally extending member 74 which is itself telescopically received in center tubular member 24. Obviously, apertures 76 of the side rail half 64 are aligned with apertures 78 of the channel section 72 and the bolt 80 secures the engagement. Consequently, with member 74 telescopically extended and with halves 64 securely engaged between channel section 72 and the respective platforms 14 and 16, a rigid laterally extending section is formed for transporting large machinery.

When the trailer is not used for this purpose, the halves 64 are removed from their supporting structures and platforms 14 and 16 together with member 74 and section 72 are moved into their retracted positions within the track of wheels 20. Halves 64 are then conveniently stored as illustrated in FIGS. 6 through 8. Therein it will be noted that a pair of channel bars 82 are mounted between the I beams 12 by a distance sufficient to accept the halves 64. The halves 64 are inserted sideways into the space between channel bars 82 and held in laterally aligned relationship by the use of one or more pins, such as shown at 84. Thus, side rail halves 64 can be conveniently maintained in this position until the trailer is to be expanded by extension of the platforms 14 and 16, at which time the side rails halves 64 are removed from channel rails 82 and connected as shown in FIGS. 1 and 2 to form the continuous trailer side.

As a consequence of the use of the removable side rail halves, the track of the trailer 10 can be increased to the maximum allowable by law in order to increase the stability and improve the towing characteristics of the trailer. Naturally, variations can exist and the members 22 through 27 can be of any length desired so long as the platforms are capable of being totally disposed within the track of the trailer when in their retracted positions.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A vehicle which is adjustable in width from a first width of legal dimensions for use on public highways to a second width for transporting wide track machinery, said vehicle comprising, in combination; a main frame extending longitudinally of said vehicle, support wheel means mounted to said main frame and having a track of legal dimensions for use on public highways, a pair of front and rear platforms spaced to the front and rear of said wheel means on at least one side of said main frame, first mounting means for mounting said platforms for movement between retracted positions wherein said platforms are wholly supported within the corresponding side of the track of said support wheel means and extended positions wherein said platforms are extended laterally outwardly past said corresponding track side, longitudinal side rail means, second mounting means removably mounting said side rail means from and between said platforms and to said main frame outwardly of said track side when said platforms are in their extended positions, said first mounting means including a plurality of first support members connected to said main frame and extending laterally thereof for a distance less than the track of said support wheel means, each of said platforms including a generally rectangular frame which is slidably received in said first support members, said second mounting means including a telescoping support member mounted from said main frame for movement between a retracted position within said track and an extended position, said second mounting means further including an extension member mounted on each of said side rail means, said extension members being received in cooperating apertures formed in said platforms, when said platforms are in their extended positions.

2. In a wheeled vehicle for the transportation of large machinery, a pair of forward platforms slidably attached to said vehicle for movement between a retracted position and an extended position, a pair of rear platforms slidably attached to said vehicle behind said forward platform for movement between a retracted position and an extended position, removable side rails, means for mounting said removable side rails between said forward platforms and said rear platforms when said platforms are in the extended position, means for storing said removable side rails when said platforms are in the retracted position, said means for mounting said removable side rails includes at least one telescoping side rail support disposed between said forward platforms and said rear platforms, said telescoping side rail support being connected to said vehicle at one end and connectible to said side rails at the opposite end, said means for mounting said removable side rails further including an extension formed on said side rails and apertures formed in said platforms for slidably receiving said extensions.

3. The apparatus of claim 2 wherein said wheeled vehicle includes a frame comprising a pair of parallel beams running longitudinally of said vehicle.

4. The apparatus of claim 3 wherein said means for storing includes a pair of opposed channel rails connected between said frame members for receiving said side rails.

5. A wheeled vehicle including a longitudinal main frame and provided for transportation of wide loads, said main frame including running gear defining a track of predetermined width, a pair of front and rear platforms supported from at least one side of said frame for sliding laterally extension and retraction relative thereto between retracted positions inward of the corresponding side of said track and extended positions projecting outwardly of the corresponding track side, said platforms being spaced apart longitudinally of said frame, and longitudinally extending side rail means releasably connected between and supported from the front and rear portions of said rear and front platforms outwardly of said track side when said platforms are in their extended positions, said main frame including a laterally extendible support, said side rail means, intermediate its opposite ends, being also removably supported from said laterally extendible support.

6. The vehicle of claim 5 wherein said running gear includes tandem wheels on each side of said frame, said wheels being disposed between said platforms and said laterally extendible support being generally centered, longitudinally of said frame between said tandem wheels.

* * * * *